United States Patent [19]
Hayward

[11] Patent Number: 5,311,912
[45] Date of Patent: May 17, 1994

[54] PROTECTIVE GAITERS FOR JOINTS

[76] Inventor: Philip F. Hayward, 47 Firbank, Euxton, Chorley, Lancashire, PR7 6HP, United Kingdom

[21] Appl. No.: 90,708

[22] Filed: Jul. 13, 1993

Related U.S. Application Data

[63] Continuation of Ser. No. 886,127, May 20, 1992, abandoned, which is a continuation of Ser. No. 833,340, Feb. 10, 1992, abandoned, which is a continuation of Ser. No. 538,917, Jun. 14, 1990, abandoned.

[51] Int. Cl.$^5$ .............................................. F16J 15/50
[52] U.S. Cl. ..................... 138/121; 74/18.1; 277/212 FB; 464/175; 403/134
[58] Field of Search ............... 138/118, 120, 121; 403/134, 51, 50; 464/175, 173, 133; 74/18.1, 18.2; 277/212 FB, 212 F, 30

[56] References Cited

U.S. PATENT DOCUMENTS

| 3,279,833 | 10/1966 | Budzynski | 277/212 FB |
| 3,279,834 | 10/1966 | Budzynski | 277/212 FB |
| 4,673,188 | 6/1987 | Matsuno et al. | 277/212 FB |
| 4,676,513 | 6/1987 | Tiegs et al. | 277/212 FB |
| 4,813,913 | 3/1989 | Belter | 277/212 FB |
| 4,878,389 | 11/1989 | Boge | 277/212 FB |

Primary Examiner—Harvey C. Hornsby
Assistant Examiner—Reginald L. Alexander
Attorney, Agent, or Firm—Pearson & Pearson

[57] ABSTRACT

A protective gaiter fits around a lubricated joint, such as a motor vehicle constant velocity joint. The gaiter has a tubular body (10) with a central flexible, folded part (18) and stepped end parts (11, 12) with channels (13, 14) for clamping devices. Folds (20, 21) are provided in the end parts (11, 12) between the channels (13, 14) so that the end parts (11, 12) as well as the central part (18) are flexible.

12 Claims, 3 Drawing Sheets

PROTECTIVE GAITERS FOR JOINTS

This is a continuation of my application Ser No. 07/886,127, filed May 20, 1992, now abandoned which was a continuation of Ser. No. 07/833,340, filed Feb. 10, 1992, now abandoned which was a continuation of original patent application Ser. No. 07/538,917, filed Jun. 14, 1990 now abandoned.

This invention relates to protective gaiters for joints particularly although not exclusively for use in motor vehicles.

Flexible rubber gaiters are used in motor cars to protect constant velocity joints so as to prevent ingress of dirt and moisture and egress of lubricants. These gaiters customarily comprise moulded tubes having cylindrical end portions suitably diametered to fit the pertaining joint members and a flexible convoluted central portion.

UK Patent No. 2156452 discloses a moulded rubber gaiter of this kind further having end portions adapted by the provision of multiple fitting sections of different diameters allowing attachment to a number of different dimensions of joint members. This provides a versatile gaiter in so far as it can be used with constant velocity joints of different motor car models by appropriate cutting away of the fitting sections. The requisite flexibility of the gaiter is derived essentially from the central portion which may be a bellows type construction and the end portions are of limited flexibility. Whilst generally satisfactory, since the end portions can represent significant parts of the length of the gaiter, limitations in the flexibility of such portions can impose limitations on the overall flexibility of time gaiter.

An object of the present invention is to eliminate or at least minimise such limitations.

According to the invention therefore there is provided a protective gaiter to fit around a lubricated joint between joint members, said gaiter comprising .a flexible tubular body having first and second ends with inner and outer surfaces thereto and a central portion between said ends, both said ends having axially spaced annular fitting sections incorporating annular seating channels around said outer surfaces to receive fixing devices whereby the said inner surfaces can be clamped into sealing engagement respectively with said joint members thereby to seal said lubricated joints, said central portion having folds therein so as to permit axial extension of the body, said fitting sections being defined by stepped configurations characterised in that, at least one said end has folds between the seating channels configured to permit axial flexing of the gaiter at said end.

With this arrangement the overall flexibility of the gaiter can be improved.

Preferably both said ends of said tubular body are configured so as to permit flexing thereof.

Said tubular body may be conically tapered and stepped and may be of Uniform thickness around the entire circumferential periphery thereof. Said body may be of uniform thickness throughout the whole length or at least a substantial part thereof.

Preferably said channels at the or each end of the body are uniformly spaced with said folds therebetween. Said central portion may be of a bellow-like configuration or may be formed as an S-bend or U-bend or the like.

The steps of said body may be flat or curved or any other suitable configuration as appropriate.

Furthermore preferably said central portion extends substantially over half the length of the tubular body.

In one embodiment the inner surface of each section is at least generally parallel to the gaiter axis.

Each fitting section may be appropriately configured on its inner surface for co-operation with a sealing configuration owl the pertaining joint member. Thus each fitting section may have one or more circumferential ribs for co-operation with a sealing groove or grooves. Each fitting section is appropriately configured on its outer surface by provision of a channel thereon to receive a fixing device such as a circlip or the like.

The gaiter may be moulded in one piece from any suitable natural or synthetic rubber material.

The invention will now be described further by way of example only and with reference to the accompanying drawings of which:

Figure 1:
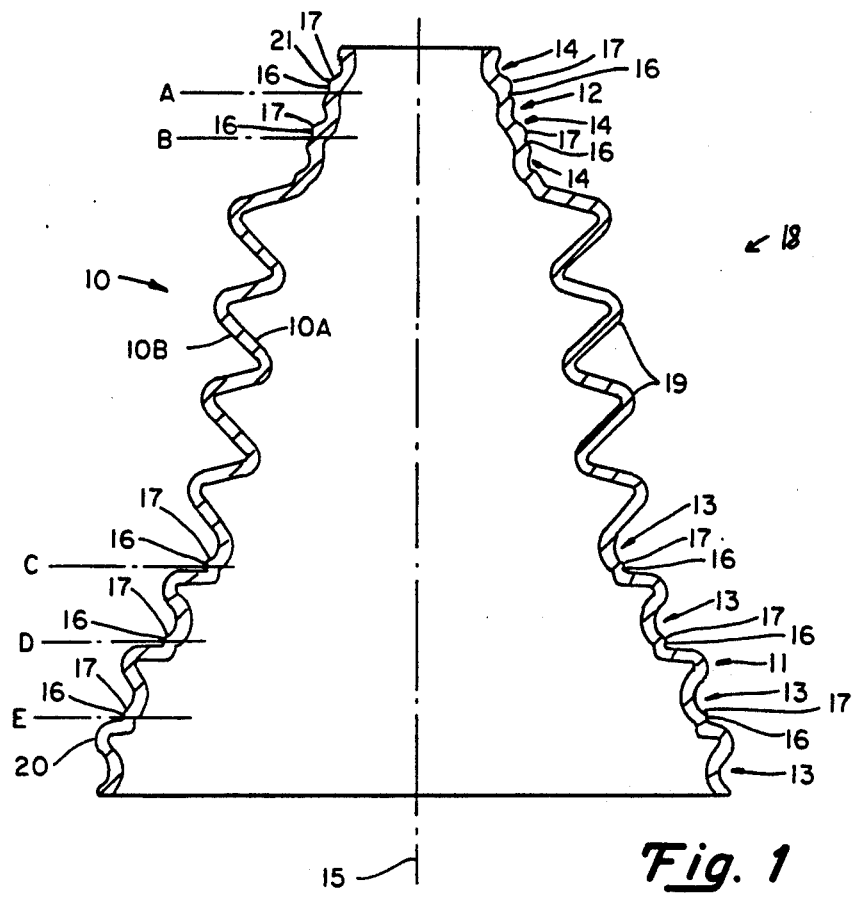
FIG. 1 is a sectional side view of one form of gaiter according to the invention.
Figure 1A:
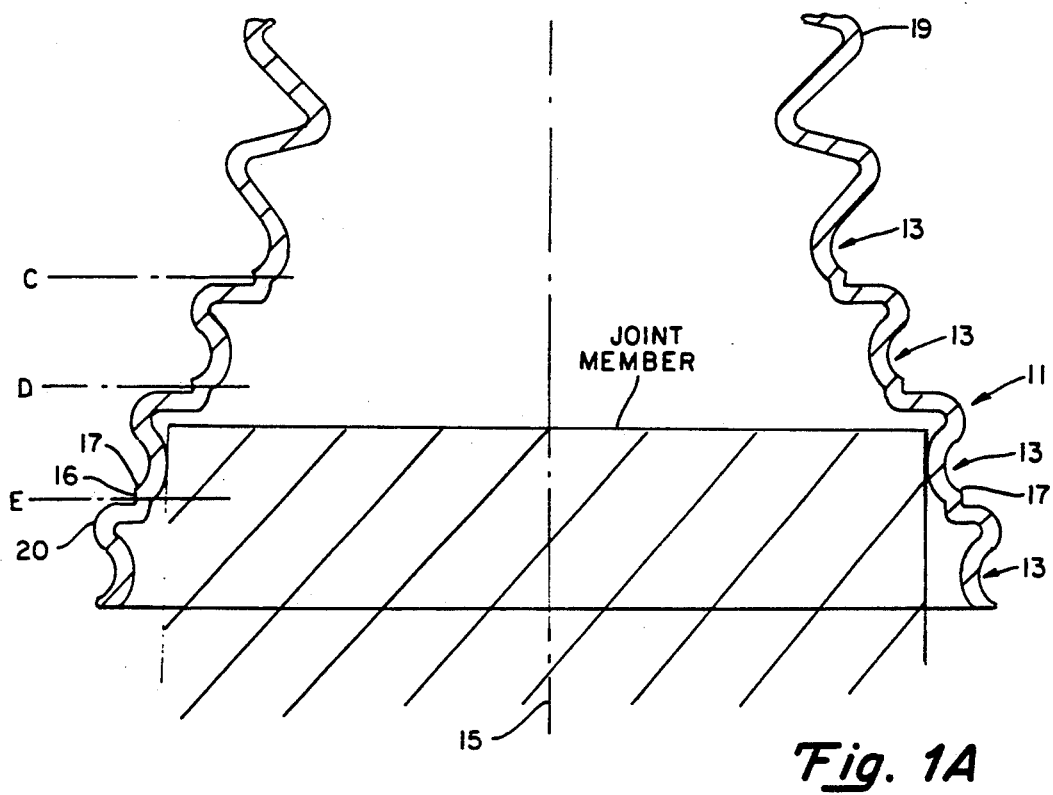
FIG. 1A is a sectional side view of the end portion of a gaiter.
Figure 1B:
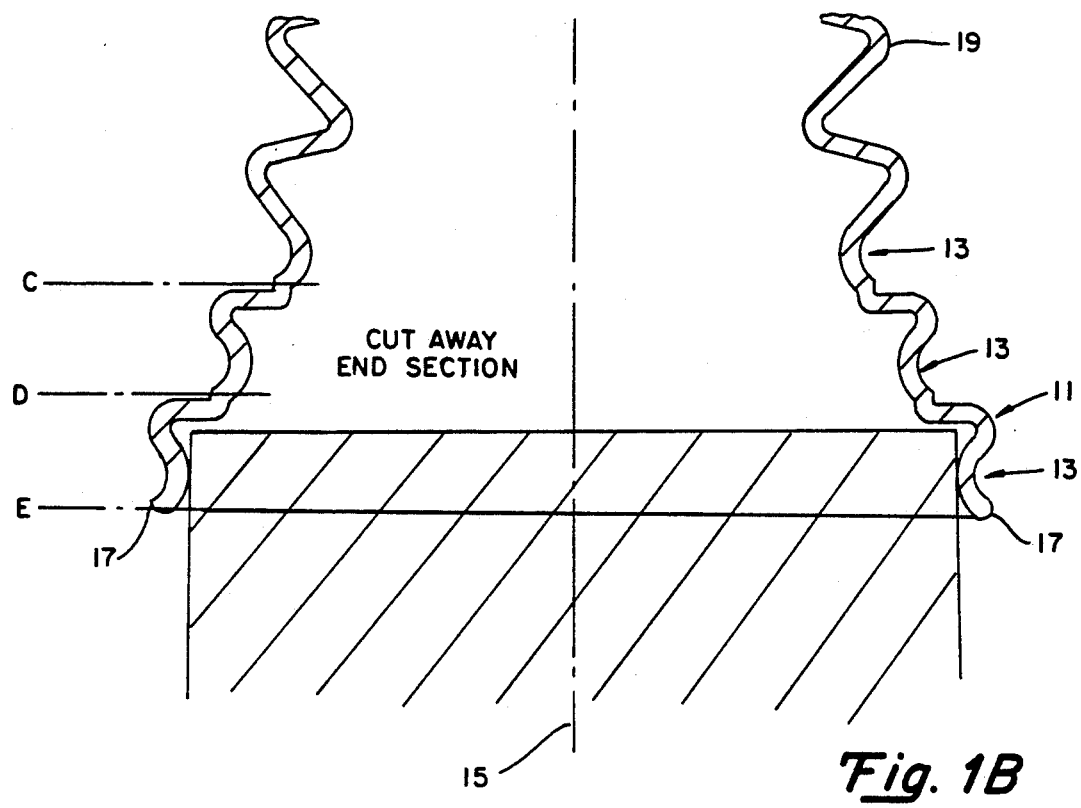
FIG. 1B is a sectional side view of the end portion of a gaiter showing the removal of the outer or largest annular seating sections.
Figure 1C:
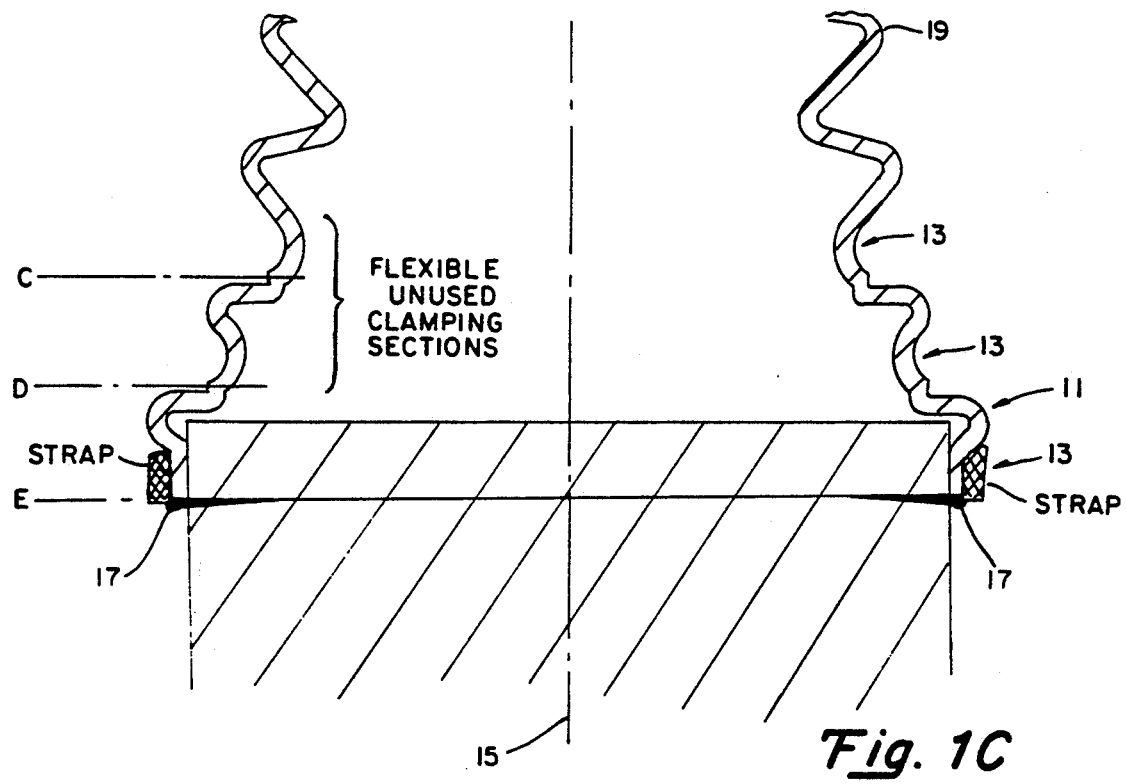
FIG. 1C is a sectional side view of the end portion of a gaiter.
Figure 2:
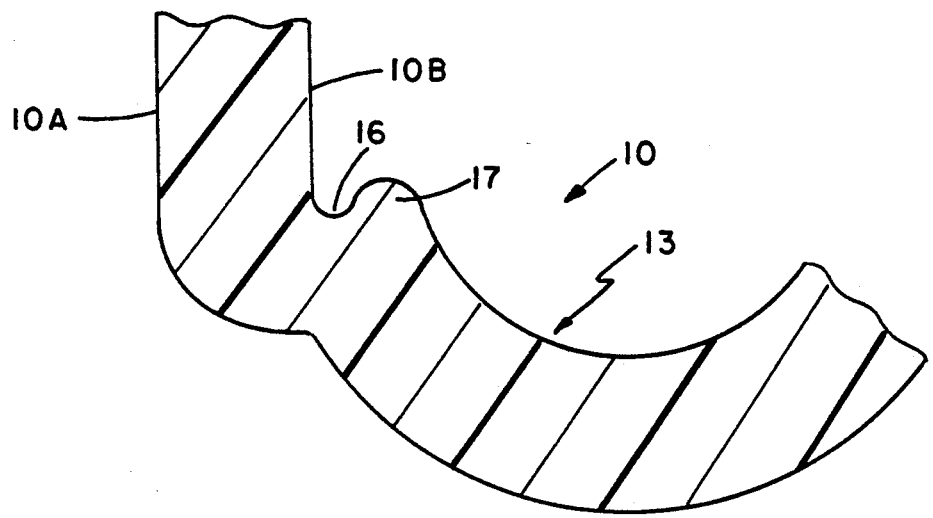
FIG. 2 is a view to a larger scale of a detail of the gaiter of FIG. 1.

The gaiter of FIGS. 1 and 2 comprises a one-piece moulded rubber tube 10 generally of frusto-conical form, The end portions 11, 12 of the tube are each stepped to define a number of annular fitting sections 13, 14 of progressively increasing diameter which extend parallel to the tube axis 15. At the wider end portion 11 of the tube 10 there are four such sections 13 increasing in diameter towards the pertaining free end. At the narrower end portion 12 there are three such sections 14 decreasing in diameter towards the pertaining free end. The end portions 11, 12 are suitably configured and adapted such that a relatively large amount of flexibility is permitted therein both transversely of and parallel to the tube axis 15.

As apparent from viewing FIG. 1, the tube 10 constitutes a frusto-conical tubular body having first and second end portions 11 and 12 wherein the first end portion 11 has a greater diameter than (i.e., is wider than) the second end portion 12. Moreover, the tubular body has a substantially constant thickness throughout. Consequently an inner surface 10A and an outer surface 10B of the tube are essentially and effectively equidistantly spaced throughout the length of the tube 10.

On its outer surface each section 13 has a curved central annular surface having at one end a groove 16 and upstanding rib 17. Each section 14 is bounded at each end thereof by an upstanding rib 17.

As shown specifically in FIG. 2, the groove 16 and rib 17 individually define annular areas that do not have a constant thickness as the groove 16 is thinner than and the lip 17 is thicker than adjacent portions of the tube 10. However, these thinner and thicker areas, being adjacent to each other, effectively act together as an area of constant thickness and flexibility. Moreover, as shown in FIG. 1, the axial extend of a groove 16 and rib 17 is insignificant in comparison with the axial extent of each annular fitting section 13. Consequently, the surfaces 10A and 10B are essentially and effectively equidistantly spaced throughout the axial length of the tubular body or tube 10.

Thus the outer surfaces of the end portions 11, 12 are convoluted defining multiple folds 20, 21 which not only allow axial flexibility but can also conveniently accommodate suitably configured projecting lips on the joint members.

The central portion 18 of the gaiter is formed into multiple convolutions 19 which allow such section to flex and also to extend axially.

With the gaiter 10 formed as above it will be appreciated that such gaiter is readily flexible along the entire length of the tubular body and not solely in the region of the central portion 18 thereof.

This has enormous advantages, not the least of which is the allowability of less restricted relative movement between the joint members protected in this way.

In use the gaiter 10 is fitted around a joint (such as a motor car constant velocity joint) and is secured in position (after filling with a suitable lubricant) by clamping one of the sections 13 at the wider end around one joint member and one of the sections 14 at the narrower end around the other joint member. Sections 13, 14, which are outwardly of the sections which are clamped in position may be cut away at respective ones of the positions identified by letters A-E on the drawing.

The sections 13, 14 are clamped in position by circlips or the like around the outer surfaces of the sections. The inner surface of the end portions 11, 12 can be suitably adapted in order to provide an efficient seal around the joint member.

The length of the gaiter 10 is adjusted as required by extension or contraction of the entire gaiter and in this respect the gaiter is manufactured so as to be capable of such deformation.

With this arrangement, it will be appreciated that the gaiter 10 can be readily adapted to fit a range of joints. The need to manufacture and stock a wide range of gaiters to fit different joints can therefore be avoided or at least minimised.

Furthermore, due to the gaiter 10 being flexible along its entire length, it is readily deformable and thus can conveniently be arranged to any length as desired in such a manner that the flexibility of the gaiter remains constant irrespective of the length thereof.

It is of course to be understood that the invention is not intended to be restricted to the details of the above embodiment which is described by way of example only.

Thus for example the ends 11, 12 and central portion 18 can be formed into any shape or configuration that ensures the desired degree of flexibility.

In the preferred form of the invention, and as shown in the accompanying drawings, the gaiter has a central portion 18 with main convolutions 19 and two end portions 11, 12 with supplementary convolutions 20, 21. The main convolutions 19 are provided exclusively in the central portion and are larger (of greater peak-to-peak displacement) and of greater axial extensibility than the supplementary convolutions. The supplementary convolutions are exclusively in the respective end portions of the gaiter and are smaller and of smaller axial extensibility. In addition to promoting flexibility, the configuration of the end portions, as mentioned, facilitates fitting over flanges having upstanding lips or the like.

I claim:

1. In a protective gaiter to fit around a lubricated joint between first and second joint members, said gaiter comprising a generally frusto-conical flexible tubular body having axially located first and second end portions and an intermediate central portion, each with inner and outer surfaces, said first end portion being wider than said second end portion and both said end portions having a plurality of axially spaced annular fitting sections to receive fixing devices for sealing said inner surfaces of said first and second end portions respectively to the first and second joint members, the improvement wherein A. said tubular body is formed with a substantially constant thickness throughout said first and second end portions and said central portion whereby said inner and outer surfaces are essentially and effectively equidistantly spaced throughout the axial length of said tubular body,
   B. said central portion has axially displaced folds for enabling axial extension of said central portion, and
   C. each of said annular fitting sections in one of said first and second end portions comprises an annular seating channel having a curved cross section and an axially juxtaposed fold positioned at the side of the seating channel which is nearer said central portion for enabling flexing of said end portions whereby said gaiter has substantial flexibility through said central portion and said end portions centrally of the fixing device.

2. A protective gaiter as recited in claim 1 wherein each of folds in said central portion has a depth that is greater than the depth of said folds in said one end portion.

3. A protective gaiter as recited in claim 1 wherein said annular seating channels are uniformly axially spaced with said juxtaposed folds being located therebetween.

4. A protective gaiter as recited in claim 1 wherein the axial extent of said central portion is greater than the axial extent of said first and second end portions.

5. A protective gaiter as recited in claim 1 wherein each of said annular fitting sections has a diameter that increases from said central portion to the end of said protective gaiter.

6. A protective gaiter as recited in claim 1 wherein each of said annular fitting sections additionally includes a radially outwardly extending rib formed adjacent said seating channel and an adjacent groove intermediate said rib and an adjacent one of said seating channels.

7. In a protective gaiter to fit around a lubricated joint between first and second joint members, said gaiter comprising a generally frusto-conical flexible tubular body having axially located first and second end portions and an intermediate central portion, each with inner and outer surfaces, said first end portion being wider than said second end portion and both said end portions having a plurality of axially spaced annular fitting sections to receive fixing devices for sealing said inner surfaces of said first and second end portions respectively to the first and second joint members, the improvement wherein A. said tubular body is formed with a substantially constant thickness throughout said first and second end portions and said central portion whereby said inner and outer surfaces are essentially and effectively equidistantly spaced throughout the axial length of said tubular body, B. said central portion has axially displaced folds for enabling axial extension of said central portion, and C. each of said annular fitting sections in each of said first and second end portions comprises an annular seating channel having a curved cross section and an axially juxtaposed fold positioned at the side of the seating channel which is nearer to said central portion for enabling flexing of each of said first and second end portions whereby said gaiter has substantial flexibility through said central portion and said first and second portions between the fixing devices.

8. A protective gaiter as recited in claim 7 wherein each of folds in said central portion has a depth that is greater than the depth of said folds in said first and second end portions.

9. A protective gaiter as recited in claim 7 wherein said annular seating channels are uniformly axially spaced with said juxtaposed folds being located therebetween.

10. A protective gaiter as recited in claim 7 wherein the axial extent of said central portion is greater than the axial extent of said first and second end portions.

11. A protective gaiter as recited in claim 7 wherein each of said annular fitting sections in said first and second end portions has a diameter that increases from said central portion to the respective end of said protective gaiter.

12. A protective gaiter as recited in claim 7 wherein each of said annular fitting sections at said first and second end sections additionally includes a radially outwardly extending rib formed adjacent said seating channel and an adjacent groove intermediate said rib and an adjacent one of said seating channels.

* * * * *